United States Patent
Acampora et al.

(10) Patent No.: US 6,266,384 B1
(45) Date of Patent: Jul. 24, 2001

(54) METHOD AND APPARATUS FOR TIME BASE RECOVERY AND PROCESSING

(75) Inventors: Alfonse Anthony Acampora, Staten Island, NY (US); Victor Vincent D'Alessandro, Berkeley Heights; Charles Martin Wine, Princeton, both of NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 08/858,634

(22) Filed: May 19, 1997

(51) Int. Cl.$^7$ ........................................................ H04L 7/00
(52) U.S. Cl. ........................ 375/363; 375/356; 370/517
(58) Field of Search ........................ 375/354, 362, 375/363, 364, 365, 366, 356, 359, 371; 395/200.66; 370/503, 516, 520, 517; 348/423.1; 709/202, 236

(56) References Cited

U.S. PATENT DOCUMENTS

| 5,467,342 | 11/1995 | Logston et al. | 370/17 |
| 5,568,403 | * 10/1996 | Deiss et al. | 709/236 |
| 5,841,987 | * 11/1998 | Blatter et al. | 709/236 |
| 5,844,636 | * 12/1998 | Joseph et al. | 348/845 |
| 5,966,387 | * 10/1999 | Cloutier | 370/516 |

* cited by examiner

Primary Examiner—Chi Pham
Assistant Examiner—Phuong Phu
(74) Attorney, Agent, or Firm—William J. Burke

(57) ABSTRACT

An apparatus and method for receiving a bitstream containing timing information and respective program information, the program information is processed and associated with locally generated timing information to form an output bitstream, the locally generated timing information is synchronized to the received timing information so that the timing relationships of the received program information are preserved even after the program information is processed.

25 Claims, 2 Drawing Sheets

METHOD AND APPARATUS FOR TIME BASE RECOVERY AND PROCESSING

This invention was made with U.S. government support under contract number 70NANB5H1174. The U.S. government has certain rights in this invnetion The invention relates to communication systems in general, and more particularly, the invention relates to a method and apparatus for retiming packetized information including timing information.

BACKGROUND OF THE DISCLOSURE

Synchronization of a decoding and presentation process for received bitstreams is a particularly important aspect of real-time digital data delivery systems such as digital television systems. Because received data is expected to be processed at a particular rate (to match the rate at which the data is generated and transmitted), loss of synchronization leads to either buffer overflow or underflow at the decoder, and as a consequence, loss of presentation and/or displaced synchronization.

In a compressed digital video system, such as the system described in the Advanced Television Systems Committee (ATSC) digital television standard document A/53, the amount of data generated to encode each picture is variable (based on the picture coding approach and complexity) and, therefore, timing cannot be derived directly from the start of picture data.

The ATSC system addresses the timing and synchronization issue by transmitting timing information in so-called adaptation fields of selected transport stream packets to serve as a reference for the timing comparison function of a decoder. This is accomplished by transmitting a sample of a 27 MHz clock in a program clock reference (PCR) field that is used to recover the encoder clock at a decoder. The frequency of a local clock running at the decoder is compared to the PCR value in the bit stream at the instant at which the PCR value is obtained to determine whether the decoding process is synchronized. In general, the PCR from the transport bit stream does not directly change the phase of the local clock, but only serves as an input to adjust the clock rate. Thus, the system clock frequency of the decoder or receiver is adjusted and locked to the 27 MHz clock of the encoder or transmitter via the transmitter clock sample included in the PCR field.

To form a program transport stream, a transport encoder multiplexes individual elementary streams which share a common time base (i.e., the same 27 MHz clock source). The elementary streams comprise encoded video, audio or other bit streams. The elementary streams may be, but don't have to be, in a packetized elementary stream (PES) format prior to transport multiplexing. A PES consists of a packet header followed by a packet payload. As the elementary streams are multiplexed, the transport encoder forms the elementary streams into transport packets and adds program identification bits to the transport packet headers that describe the program.

At the decoder, the coordination between the elements of the program is primarily controlled at the presentation display stage based on the use of the common time base. This common time base is imposed by having all the elementary bit streams in a program derive timing information from a single clock, and then by transmitting this timing information via the PCR in an adaptation field of a designated reference transport packet. The data for timing of decoding and presentation is present as decode time stamp (DTS) and presentation time stamp (PTS), respectively, in the packetized elementary bit stream for each individual application.

The above-described timing arrangement is somewhat inflexible in certain applications. For example, it may be desirable to process an elementary stream included within a transport stream. Therefore, a need exists in the art for a time base recovery and insertion method which allows the timing relationships of an input stream to be recovered, modified, and inserted into an output stream.

SUMMARY OF THE INVENTION

The disadvantages heretofore associated with the prior art are overcome by the present invention of a time base recovery and processing method and apparatus that extracts timing information from a bitstream containing timing information and respective program information. The program information may be subjected to further processing steps prior to being associated with locally generated timing information to form an output bitstream. The extracted timing information is used to correct the local timing information such that the timing relationships of the received program information are preserved even after the program information is processed.

Additional corrections may be made to the locally generated timing information. For example, a time delay representing the amount of time required to process the program information may be added to the corrected timing information. In addition, a time shift representing a positive or negative temporal offset may be included in the corrected timing information to control program information temporal alignment.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be described within the context of an ATSC-compliant elementary stream processor including a PCR recovery and processing system that extracts the PCR from an incoming data stream, processes a locally generated PCR using the extracted PCR, and inserts the processed PCR into an outgoing bitstream of a transport stream encoder (TSE). It should be noted that the timing methods to be described are applicable to any digital communication system employing a layered approach in which timing information is passed between layers.

An elementary video stream processor may be generally described as follows. An incoming transport bitstream undergoes transport stream decoding (TSD) and packetized elementary stream (PES) decoding to produce an elementary video stream. The video stream is subjected to a pixel domain process (e.g., a conversion from interlace scanning to progressive scanning). The processed video stream is then PES encoded and transport stream encoded (TSE) to produce an outgoing transport stream.

In the above-described example the PCR signal imbedded in the input transport stream is used to properly decode the elementary video stream for pixel domain processing. In addition, a (local) station clock 27 MHz reference is used by a local PCR generator to generate the timing signals used by the TSE to form PCR reference packets in the outgoing transport stream, and to form decode and presentation time references in the PES packet header. Unfortunately, the above-described example does not adequately preserve the time stamps or time references of the received data streams for inclusion in the re-constructed transmitter streams. Moreover, this arrangement does not provide time correction or compensation to account for any timing latency implications of the pixel domain process.

Figure 1:
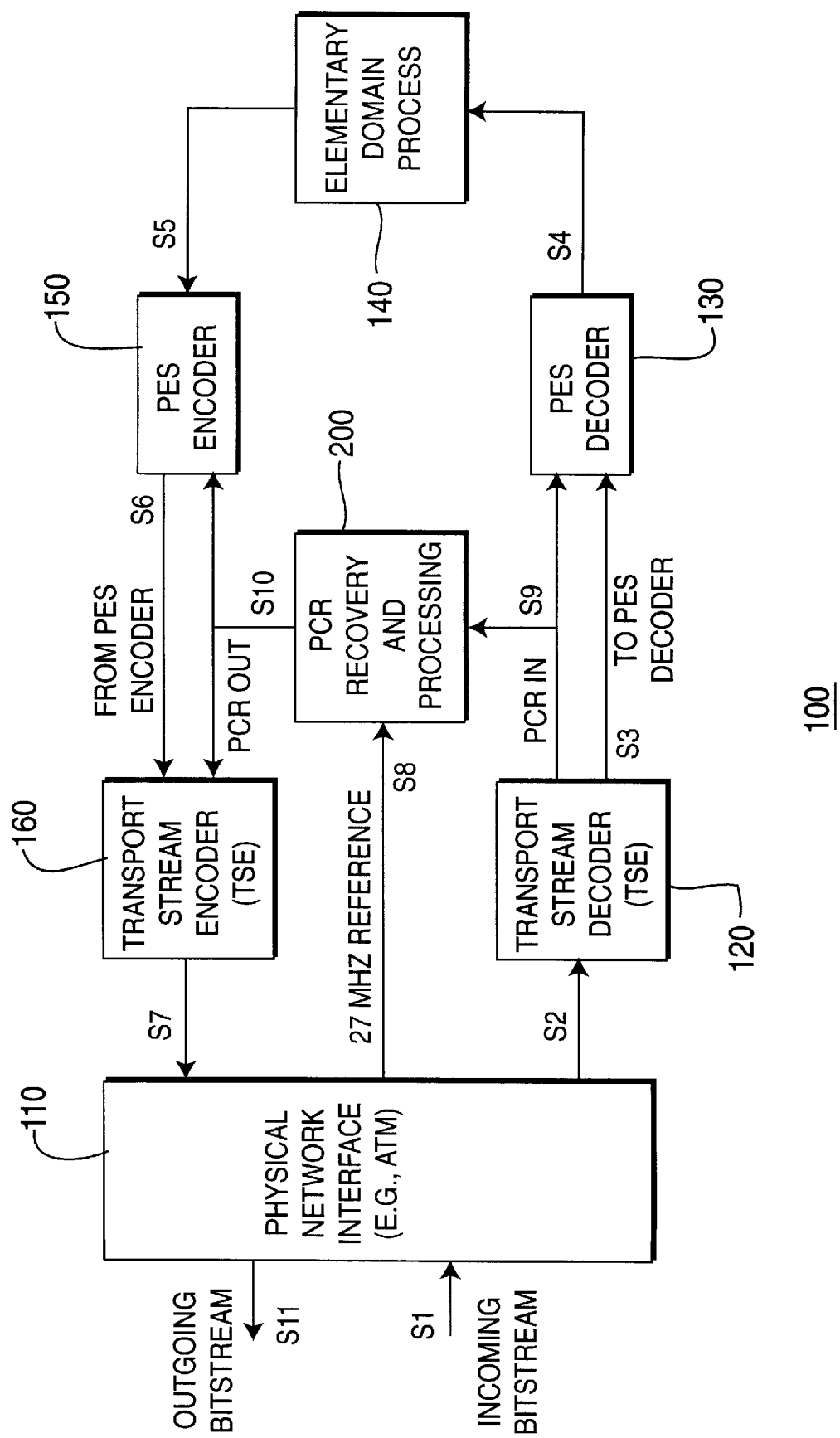
FIG. 1 shows a block diagram of an elementary stream processor system including a timing recovery and processing system according to the invention.

FIG. 1 shows a block diagram of an elementary stream processing system 100 including a timing recovery and processing system 200 according to the invention. An incoming bitstream S1 (illustratively an ATSC transport stream included within an asynchronous transfer mode (ATM) stream) is received by a physical network interface unit 110. Interface unit 110 decodes the incoming ATM bitstream S1 to produce an input transport bitstream S2. A transport stream decoder 120 decodes the input transport bitstream S2 to produce a packetized elementary stream (PES) S3. A PES decoder 130 decodes PES stream S3 to produce an elementary stream S4, illustratively a video stream. An elementary domain processor 140 performs an elementary domain process (illustratively, a pixel domain process such as a change of bit rate or a conversion from interlace scanning to progressive scanning (also referred to as "proscan") on elementary stream S4 to produce a processed elementary stream S5. A PES encoder 150 encodes processed elementary stream S5 to produce PES stream S6. Transport stream encoder 160 encodes PES stream S6 to produce a transport stream S7. Interface unit 110 encodes transport stream S7 to produce an outgoing ATM bitstream S11.

The input transport bitstream S2 includes program clock reference (PCR) information, including a program clock reference base (PCRB) information component which is transferred to the PES decoder 130 so that the PES bitstream S3 can be properly decoded. To facilitate transport stream reconstruction, TSE 160 must insert PCR information into the output transport stream S7.

It is often desirable to maintain a timing relationship between the incoming PCR information S9 and the outgoing PCR information S10. This relationship is maintained by a PCR recovery and processing unit 200.

Processing unit 200 receives the incoming PCR information S9 from TSD 120 and a 27 MHz local reference signal S8 from interface unit 110. The incoming PCR information S9 is processed to produce the outgoing PCR information S10 for use by TSE 160 and PES encoder 150. The outgoing PCR information S10 represents the local 27 MHz reference signal corrected to the incoming PCR time reference. By using the corrected outgoing PCR information S10 during the transport encoding process (to form PCR packets in transport stream encoder 160) and during the PES encoding process (to insert the presentation time stamps (PTS) and decode time stamps (DTS) in the PES bitstream S7 formed in the PES encoder 150), the output stream S7 will have proper time relationships as were present in stream S3. Thus, the timing information extracted from the received transport stream is used to correct locally-generated timing information. The corrected locally generated timing information is used to time stamp the output transport stream formed by TSE 160. In this manner the timing relationships of the received program information are preserved when the information is re-encoded into a transport stream, even if the received program information is processed in some manner.

Processing unit 200 may also be used to provide additional corrections to the locally generated timing information. For example, a time delay representing the amount of time required to process the program information may be added to the corrected timing information. Such a processing delay component is important if there is a need to track absolute time, such that a particular frame will have the same presentation time (in a remote decoder) as that particular frame had when it arrived from the physical layer. In addition, a time shift representing a positive or negative temporal offset may be included in the corrected timing information to allow for control of program information temporal alignment. Such a time shift component is useful to earmark an elementary bitstream for some subsequent presentation, or if a processor (not shown) is providing a correction to align the time stamps in the incoming bitstream to an absolute (wall clock) studio reference.

Figure 2:
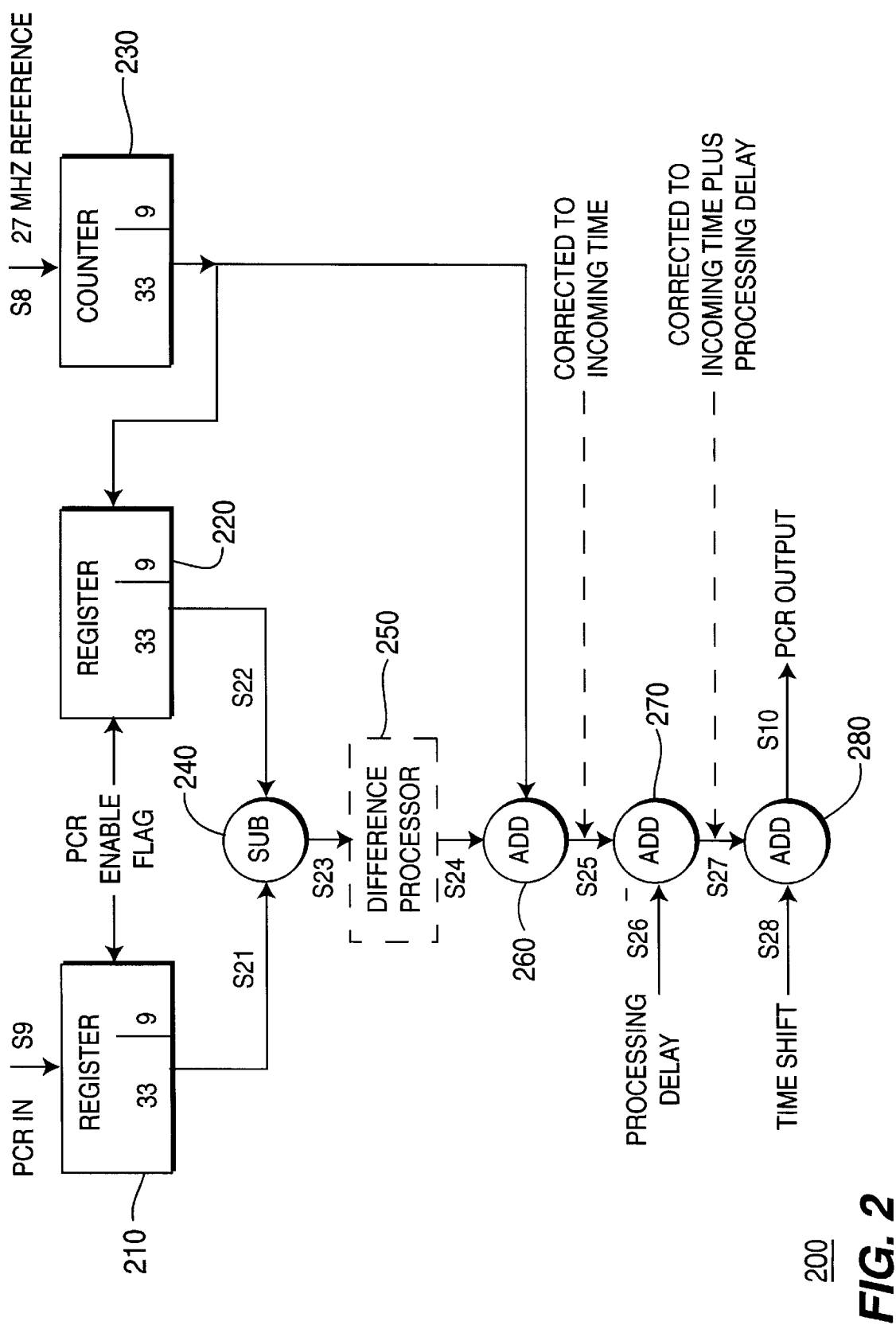
FIG. 2 shows a detailed block diagram of the timing recovery and processing system of FIG. 1.

FIG. 2 shows a detailed block diagram of the timing recovery and processing unit 200 of FIG. 1. The timing recovery system 200 couples the 27MHz reference signal S8 to a clock input of a counter unit 230. Counter 230 is a 42 bit counter arranged as two separate counters of, respectively, a PCR base (33 bits) and a PCR extension (9 bit modulo 300). A PCR ENABLE FLAG within transport stream S2 indicates that a PCR packet is present within the transport stream S2. In response to the PCR ENABLE FLAG a first register 210 stores the PCR present within the transport stream S2 and a second register 220 stores the instantaneous contents of the counter 230.

A subtracter 240 subtracts the contents of the first 210 and second 220 registers to produce a difference signal S23. The difference signal S23 is updated each time a new PCR is present in the transport stream. If there was no packet jitter across those packets containing the PCR information, then this difference would remain constant at each update. As previously mentioned, the PCR is a sample of the 27 MHz clock used to send a time reference in the transport stream and time stamp the program and other information contained in the PES stream. The PCR present in the transport stream may be formed in an arithmetically similar manner to the locally generated PCR (e.g., a 27 MHz clocked 42 bit counter arranged as a PCR base (33 bits) and a PCR extension (9 bit modulo 300)). As such, the difference between the PCR in the transport stream and the locally generated PCR (i.e., S21 and S22) represents a temporal offset.

However, it is possible for the difference signal S23 to include some jitter (i.e., due to the variable delay of certain physical networks, such as asynchronous transfer mode (ATM) networks). This jitter will, e.g., affect the transport stream encoding by introducing a timing error into the transport stream.

An optional difference processor 250 may be used to reduce the above-described jitter in difference signal S23. Difference processor 250 stores a number of successive difference signals, where each difference signal is associated with a respective incoming PCR. The stored difference signals are processed by, e.g., straight averaging, exponential smoothing or other forms of filtering to produce a relatively jitter free processed difference signal S24. Another technique is to lock in the difference S23 at start-up time, and then maintain this difference as S24 as long as S23 remains within some threshold boundary.

The processed S24 or unprocessed S23 difference signal is continually added to the instantaneous contents of the counter 230 by an adder 260. The output signal S25 of the adder 260 represents the local 27 MHz reference signal corrected to track the incoming PCR time reference. The output signal S25 is a PCR time reference suitable for use by TSE 160 as outgoing PCR information S10. However, as previously mentioned, it may be desirable to include a processing delay component or a time shift component, (or both) in the outgoing PCR information S10.

A first optional adder 270 subtracts a delay signal S26 from the output signal S25 of adder 260. This delay reflects the amount of time necessary to perform the elementary domain processing and other operations. The output signal S27 of the first optional adder represents a corrected PCR time reference including any processing delay. The operation of the first optional adder 260 may be excluded by setting the value of delay signal S26 to zero.

A second optional adder 280 adds a positive or negative time shift signal S28 to the output signal S27 of the first optional adder 270. The output signal S10 of the second optional adder represents a corrected PCR time reference plus any added delay plus (or minus) any time shift. This time shift may reflect, e.g., a correction to align the time stamps in the incoming bitstream to an absolute (wall clock) studio reference. The operation of the second optional adder 280 may be excluded by setting the value of time shift signal S28 to zero.

It should be noted that the invention is applicable to any digital data system employing a layered approach in which timing information is passed between layers. Moreover, the described elementary domain processor 140 may comprise a number of processors coupled in series or parallel. These processors may be operable on one or more elementary streams (e.g., video, audio, data, etc.) in the received transport stream.

Although various embodiments which incorporate the teachings of the present invention have been shown and described in detail herein, those skilled in the art can readily devise many other varied embodiments that still incorporate these teachings.

What is claimed is:

1. A method for processing at least one elementary stream included within a transport stream, said method comprising the steps of:

recovering, from said transport stream, said at least one elementary stream to be processed, and a program clock reference (PCR) periodically included within reference packets within said transport stream;

processing said received at least one elementary stream to produce at least one processed elementary stream;

correcting a locally generated PCR using said recovered PCR; and periodically inserting said corrected locally generated PCR into an output transport stream including said at least one processed elementary stream, said periodically inserted PCR being included within reference packets within said output transport stream;

said step of correcting comprising calculating a difference between said recovered PCR and said local PCR, adding said difference to said locally generated PCR, and incrementing said corrected locally generated PCR by an amount of time approximating the time for processing a portion of said elementary stream.

2. The method of claim 1 wherein said step of correcting further comprises the step of incrementing or decrementing said corrected locally generated PCR by a predetermined amount of time.

3. The method of claim 1 wherein said locally generated PCR is generated according to the steps of:

continually counting at a 27 MHz count rate; and storing an instantaneous count value as said locally generated PCR in response to indicium of the presence of a PCR in said transport bitstream.

4. The method of claim 1 wherein said step of calculating a difference between said recovered PCR and said local PCR is repeated each time a PCR is recovered from said transport stream to produce a sequence of calculated differences, said method further comprising the step of filtering each calculated difference using said sequence of calculated differences.

5. A method for processing at least one elementary stream included within a transport stream, said method comprising the steps of:

recovering, from said transport stream, said at least one elementary stream to be processed, and a program clock reference (PCR) periodically included within reference packets within said transport stream;

processing said received at least one elementary stream to produce at least one processed elementary stream;

correcting a locally generated PCR using said recovered PCR; and periodically inserting said corrected locally generated PCR into an output transport stream including said at least one processed elementary stream, said periodically inserted PCR being included within reference packets within said output transport stream;

said step of correcting comprising calculating a difference between said recovered PCR and said local PCR, adding said difference to said locally generated PCR, and incrementing or decrementing said corrected locally generated PCR by a predetermined amount of time.

6. The method of claim 5 wherein said locally generated PCR is generated according to the steps of:

continually counting at a 27 MHz count rate; and storing an instantaneous count value as said locally generated PCR in response to indicium of the presence of a PCR in said transport bitstream.

7. The method of claim 5 wherein said step of calculating a difference between said recovered PCR and said local PCR is repeated each time a PCR is recovered from said transport stream to produce a sequence of calculated differences, said method further comprising the step of filtering each calculated difference using said sequence of calculated differences.

8. A method for processing at least one elementary stream included within a transport stream, said method comprising the steps of:

recovering, from said transport stream, said at least one elementary stream to be processed, and a program clock reference (PCR) periodically included within reference packets within said transport stream;

processing said received at least one elementary stream to produce at least one processed elementary stream;

correcting a locally generated PCR using said recovered PCR; and periodically inserting said corrected locally generated PCR into an output transport stream including said at least one processed elementary stream, said periodically inserted PCR being included within reference packets within said output transport stream;

said at least one elementary stream within said input transport stream comprises a packetized elementary stream (PES) including a plurality of access units, each of said access units having associated with it at least one of decode timestamp (DTS) and a presentation timestamp (PTS), said DTS and PTS being defined with respect to a PCR; said method further comprising the steps of:

decoding, using said recovered PCR, said at least one PES within said transport stream;

processing said decoded PES using an appropriate elementary domain process to produce a processed elementary stream; and encoding, using said corrected locally generated PCR, said processed elementary stream to produce at least one output PES comprising a plurality of access units having associated with them it at least one of respective decode timestamps and presentation timestamps.

9. The method of claim 8, wherein said steps of decoding, processing and encoding are used to process each of a plurality of packetized elementary streams within said input transport stream.

10. The method of claim 8, further comprising the step of:

extracting said input transport stream from a network information stream including said input transport stream.

11. The method of claim 10, wherein said network information stream comprises an asynchronous transfer mode (ATM) stream, and said input transport stream comprises an MPEG compliant transport stream.

12. The method of claim 10, further comprising the step of:

inserting said output transport stream into a network information stream.

13. The method of claim 12, wherein said network information stream comprises an asynchronous transfer mode (ATM) stream, and said input transport stream comprises an MPEG compliant transport stream.

14. Apparatus for processing at least one elementary stream included within a transport stream, said apparatus comprising:

a transport stream decoder, for extracting at least one elementary stream from said transport stream and for recovering a program clock reference (PCR) periodically included within reference packets within said transport stream;

a PCR processor, coupled to said transport stream decoder and to a local PCR source, for correcting a locally generated PCR using said recovered PCR;

an elementary stream processor, for processing said at least one extracted elementary stream to produce at least one processed elementary stream; and a transport stream encoder, for periodically inserting said corrected locally generated PCR into said reference packets within an output transport stream including said at least one processed elementary stream;

said PCT processor comprising:

a subtractor, responsive to said recovered PCR and said locally generated PCR to produce a difference signal;

a first adder, responsive to said difference signal and said locally generated PCR to produce said corrected locally generated PCR; and a second adder, responsive to said corrected locally generated PCR and a processing delay signal, for incrementing said corrected locally generated PCR by an amount of time according to said processing delay signal.

15. The apparatus of claim 14 wherein said PCR processor further comprises:

a third adder, responsive to said corrected locally generated PCR and a time shift signal, for incrementing or decrementing said corrected locally generated PCR by an amount of time according to said time shift.

16. The apparatus of claim 14, wherein said at least one elementary stream extracted by said transport stream decoder comprises a packetized elementary stream (PES) including a plurality of access units, each of said access units having associated with it at least one of decode timestamp (DTS) and a presentation timestamp (PTS), said DTS and PTS being defined with respect to a PCR, said apparatus further comprising:

a PES decoder, for decoding an input PES using said recovered PCR to provide an elementary stream;

an elementary stream processor, for processing said decoded elementary stream to produce a processed elementary stream; and a PES encoder, for encoding said processed elementary stream using said corrected locally generated PCR to produce an output PES.

17. The apparatus of claim 16, wherein each of a plurality of PES streams within said input transport stream are processed by said PES decoder, elementary stream processor and PES encoder.

18. The apparatus of claim 14, further comprising:

a network interface, coupled to receive a network information stream and extracting therefrom said input transport stream.

19. The apparatus of claim 18, wherein said network information stream comprises an asynchronous transfer mode (ATM) stream, and said input transport stream comprises an MPEG compliant transport stream.

20. The apparatus of claim 18, wherein said network interface operates to insert said output transport stream into a network information stream.

21. The apparatus of claim 20, wherein said network information stream comprises an asynchronous transfer mode (ATM) stream, and said input transport stream comprises an MPEG compliant transport stream.

22. Apparatus for processing at least one elementary stream included within a transport stream, said apparatus comprising:

a transport stream decoder, for extracting at least one elementary stream from said transport stream and for recovering a program clock reference (PCR) periodically included within reference packets within said transport stream;

a PCR processor, coupled to said transport stream decoder and to a local PCR source, for correcting a locally generated PCR using said recovered PCR;

an elementary stream processor, for processing said at least one extracted elementary stream to produce at least one processed elementary stream; and a transport stream encoder, for periodically inserting said corrected locally generated PCR into said reference packets within an output transport stream including said at least one processed elementary stream;

said transport stream and said output transport stream conforming to a common transport stream format;

said PCT processor comprising:
- a subtractor, responsive to said recovered PCR and said locally generated PCR to produce a difference signal; and
- a first adder, responsive to said difference signal and said locally generated PCR to produce said corrected locally generated PCR; and
- a second adder responsive to said corrected locally generated PCR and a time shift signal, for incrementing or decrementing said corrected locally generated PCR by an amount of time according to said time shift.

23. The apparatus of claim 22 wherein said PCR processor further comprises:
- a third adder, responsive to said corrected locally generated PCR and a time shift signal, for incrementing or decrementing said corrected locally generated PCR by an amount of time according to said time shift.

24. The apparatus of claim 22, wherein said at least one elementary stream extracted by said transport stream decoder comprises a packetized elementary stream (PES) including a plurality of access units, each of said access units having associated with it at least one of decode timestamp (DTS) and a presentation timestamp (PTS), said DTS and PTS being defined with respect to a PCR, said apparatus further comprising:
- a PES decoder, for decoding an input PES using said recovered PCR to provide an elementary stream;
- an elementary stream processor, for processing said decoded elementary stream to produce a processed elementary stream; and
- a PES encoder, for encoding said processed elementary stream using said corrected locally generated PCR to produce an output PES.

25. The apparatus of claim 22, wherein each of a plurality of PES streams within said input transport stream are processed by said PES decoder, elementary stream processor and PES encoder.

* * * * *